United States Patent [19]

Lange, deceased

[11] 3,910,874

[45] Oct. 7, 1975

[54] WATER-INSOLUBLE THIAZOLE AND THIADIAZOLE AZO DYESTUFFS

[75] Inventor: Guenter Lange, deceased, late of Ludwigshafen, Germany, by Elisabeth Hedwig Lange, heiress-at-law

[73] Assignee: Badische Anilin- & Soda-Fabrik Aktiengesellschaft, Ludwigshafen (Rhine), Germany

[22] Filed: May 28, 1971

[21] Appl. No.: 148,239

Related U.S. Application Data

[63] Continuation-in-part of Ser. No. 828,387, May 27, 1969, Pat. No. 3,658,784.

[30] Foreign Application Priority Data

June 1, 1968 Germany............................ 1769503

[52] U.S. Cl.................................. 260/158; 260/483
[51] Int. Cl.$^2$......................................... C09L 29/08
[58] Field of Search.................................... 260/158

[56] References Cited
UNITED STATES PATENTS
3,097,198  7/1963  Fishwick et al................. 260/207.1

FOREIGN PATENTS OR APPLICATIONS
1,503,249  10/1967  France.............................. 260/158

*Primary Examiner*—Henry R. Jiles
*Assistant Examiner*—Robert W. Ramsuer
*Attorney, Agent, or Firm*—Johnston, Keil, Thompson & Shurtleff

[57] ABSTRACT

Water-insoluble p-aminoazo dyes having a thiadiazole diazo component and an acetoacetoxyalkyl group on the amino nitrogen atom of a p-aminophenyl coupling component which are particularly useful for dyeing cellulose esters and synthetic linear polymers such as polyamides, polyurethanes, polyvinyl chloride or polyesters and which have excellent light and wet fastness and resistance to gas-fume fading.

3 Claims, No Drawings

WATER-INSOLUBLE THIAZOLE AND THIADIAZOLE AZO DYESTUFFS

This application is a continuation-in-part of U.S. application Ser. No. 828,387 filed on May 27, 1969, now U.S. Pat. No. 3,658,784.

This invention relates to water-insoluble p-aminoazo dyes having the formula (I):

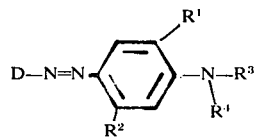

where
D is the radical of the formula

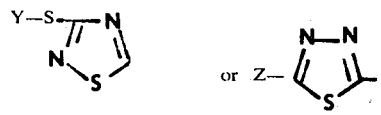

Y is methyl or carbomethoxyethyl;
Z is ethyl, phenyl or p-chlorophenyl;
$R^1$ is hydrogen, methyl, ethyl, methoxy or ethoxy;
$R^2$ is hydrogen, chlorine, methyl, ethyl, methoxy, ethoxy, acetylamino or propionylamino;
$R^3$ is the radical having the formula:

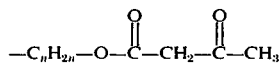

$R^4$ is the radical having the formula

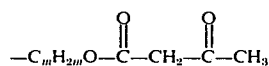

or the formula $-C_mH_{2m}-X$;
n is one of the integers 2 and 3
m is one of the integers 1, 2, 3 and 4; and
X is hydrogen, hydroxy, cyano, methoxy or ethoxy.

Examples of amines or diazo components from which the radical D is derived are:
2-amino-5-phenylthiadiazole-1,3,4,
2-amino-5-ethylthiadiazole-1,3,4,
2-amino-5-(4'-chlorophenyl)-thiadiazole-1,3,4,
2-amino-4-methylmercaptothiadiazole-1,3,5, and
2-amino-4-carbomethoxyethylmercaptothiadiazole-1,3,5.

Examples of radicals $R^4$ which are different from $R^3$ are: methyl, ethyl, n-propyl, isopropyl, n-butyl, isobutyl, β-hydroxyethyl, β-cyanoethyl, β-methoxyethyl, β-ethoxyethyl, γ-hydroxypropyl or γ-methoxypropyl.

Examples of aniline derivatives having the formula (II):

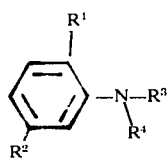

where $R^1$, $R^2$, $R^3$ and $R^4$ have the meanings given above and which are contained in the dyes having the formula (I) as coupling components are:
N-(acetoacet-β-hydroxyethyl)-N-methylaniline,
N-bis-(acetoacet-β-hydroxyethyl)-aniline,
N-(acetoacet-Ψ-hydroxybutyl)-N-ethylaniline,
N-(acetoacet-β-hydroxyethyl)-N-β-cyanoethylaniline,
N-(acetoacet-β-hydroxyethyl)-N-β-hydroxyethylaniline,
N-(acetoacet-β-hydroxyethyl)-N-β-methoxyethylaniline,
N-(acetoacet-β-hydroxyethyl)-N-ethyl-m-toluidine,
N-(acetoacet-β-hydroxyethyl)-N-ethyl-m-methoxyaniline,
2-methyl-5-ethoxy-N-(acetoacet-β-hydroxyethyl)-N-ethylaniline or
N-(acetoacet-β-hydroxyethyl)-N-β-hydroxyethyl-m-acetylaminoaniline.

The new dyes having the formula (I) may be obtained for example by reaction of diazo compounds of amines having the formula (III):

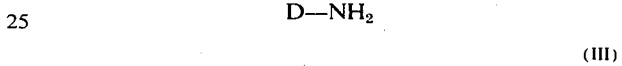

with coupling components having the formula (II).
Dyes having the formula (IV):

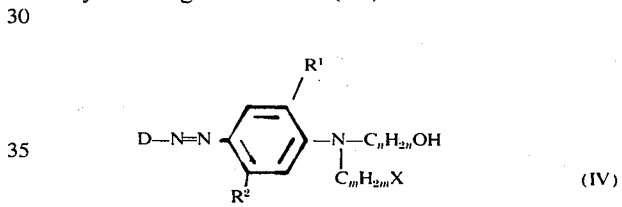

where D, $R^1$, $R^2$, m, n and X have the meanings given above may also be reacted with compounds which yield the radical

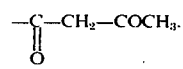

Examples of such compounds are alkyl acetoacetates, preferably methyl or ethyl acetoacetate or particularly diketene.

The new dyes are suitable, particularly in finely divided form, for dyeing and/or printing synthetic and cellulosic fibers such as polyesters, polyamides, polyurethanes, polyvinyl chloride and particularly cellulose esters and ethers.

It is advantageous to use mixtures of the dyes according to this invention. These mixtures are for example obtained when diazo compounds of amines having the formula $D-NH_2$ are reacted with a mixture of coupling components having the formula (II) which has been prepared by incomplete acylation of a starting component having the general formula (V):

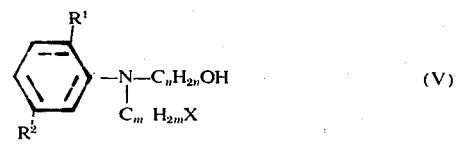

or when dyes having the formula (IV) are incompletely acylated. Preferred compounds to be acylated are those in which X denotes a hydroxyl group.

The new dyes or dye mixtures give scarlet to blue dyeings which have excellent light and wet fastness and which are very resistant to gas-fume fading.

The invention is illustrated by the following Examples in which the parts and percentages relate to weight.

EXAMPLE 1

12 parts of 3-carbomethoxyethylmercapto-5-aminothiadiazole-1,2,4 is introduced at from 10° to 15°C into a mixture of 30 parts of sulfuric acid, 50 parts of propionic acid and 50 parts of glacial acetic acid. 15 parts of nitrosylsulfuric acid (12.7 percent of dinitrogen trioxide) is run in slowly and the diazo solution thus prepared is stirred for another 4 hours and then poured into a coupling solution which has been obtained by dissolving 14.5 parts of N-acetoacet-$\beta$-hydroxyethyl-N-$\beta$-cyanoethylaniline in 25 parts of hydrochloric acid (10 moles per liter) and 100 parts of water followed by the addition of 700 parts of ice and 200 parts of ice water.

After the diazo solution has been run in, the whole is neutralized with 120 parts of caustic soda solution (10 moles per liter) and stirred overnight, and the dye is isolated as usual. 20 parts of a powder is obtained which dyes acetate rayon bright scarlet shades.

EXAMPLE 2

A diazo solution is prepared analogously to Example 1 from 7.3 parts of 3-methylmercapto-5-aminothiadiazole-1,2,4 and is then added to a coupling solution which has been obtained by dissolving 15 parts of N-acetoacet-$\beta$-hydroxyethyl-N-$\beta$-cyanoethyl-m-toluidine in 50 parts of water with an addition of 300 parts of ice and 250 parts of ice water.

After the diazo solution has been added, the whole is neutralized to pH 5 with 100 parts of caustic soda solution (10 moles per liter). The product is processed as usual after being stirred overnight. 24 parts of a dye is obtained which gives bright scarlet dyeings on acetate rayon.

EXAMPLE 3

9 parts of 2-amino-5-phenylthiadiazole-1,3,4 is introduced into a mixture of 50 parts of phosphoric acid, 15 parts of sulfuric acid and 15 parts of nitrosylsulfuric acid (12.7 percent of dinitrogen trioxide). After the diazo solution thus prepared has been stirred for four hours the diazo solution is added to a coupling solution which has been obtained by dissolving 13.5 parts of N-acetoacet-$\beta$-hydroxyethyl-N-ethylaniline in 10 parts of water and 50 parts of ice followed by an addition of 600 parts of ice.

When all the diazo solution has been added, the whole is further diluted with another 250 parts of ice water and neutralized to a pH value of from 5 to 6 by adding 140 parts of caustic soda solution (10 moles/liter). The whole is stirred overnight and the deposited precipitate is suction filtered, washed until neutral with water and dried at 50°C at subatmospheric pressure. 15 parts of a powder is obtained which dyes acetate rayon bright scarlet shades.

Production of the coupling components:

90.5 parts of N-di-$\beta$-hydroxyethylaniline has 70 parts of methyl acetoacetate added to it and is then heated first to 120°C and then slowly to 160°C. The total duration of the heating is 6 hours. 18 parts of methanol distil over slowly. The whole is then cooled to 80°C and a small amount (about 1 part) of unreacted methyl acetoacetate is removed at from 10 to 15 mm.

132 parts of a pale oil is obtained which contains N-(acetoacet-$\beta$-hydroxyethyl)-N-$\beta$-hydroxyethylaniline as main product and small amounts of corresponding diester and starting material. The molecular weight determined from coupling with nitrosamine is 270.

The following coupling components (which contain N-(acetoacet-$\beta$-hydroxyethyl)-N-$\beta$-hydroxyethyl-m-toluidine or N-(acetoacet-$\beta$-hydroxyethyl)-N-$\beta$-hydroxyethyl-m-acetaminoaniline as main product) which are hereinafter described under the name of the main product are obtained in the same way from the appropriate starting materials.

Dyes characterized by the diazo and coupling components in the following Table are obtained by a method analogous to that described in Examples 1 to 4.

In the following Table, the Coupling Components (CC) used are as follows:

1. N-(acetoacet-$\beta$-hydroxyethyl)-N-ethylaniline
2. N-(acetoacet-$\beta$-hydroxyethyl)-N-cyanoethylaniline
3. N-(acetoacet-$\beta$-hydroxyethyl)-N-cyanoethyl-m-toluidine
4. N-(acetoacet-$\beta$-hydroxyethyl)-N-methoxyethylaniline
5. N,N-di-(acetoacet-$\beta$-hydroxyethyl)-m-toluidine
6. N-(acetoacet-$\beta$-hydroxypropyl)-N-cyanoethylaniline
7. N-(acetoacet-$\beta$-hydroxyethyl)-N-benzyl-m-toluidine
8. N-(acetoacet-$\beta$-hydroxyethyl)-N-benzylaniline
9. N-(acetoacet-$\beta$-hydroxyethyl)-N-ethyl-m-toluidine
10. N-(acetoacet-$\beta$-hydroxyethyl)-N-$\beta$-hydroxyethyl-m-toluidine
11. N-(acetoacet-$\beta$-hydroxyethyl)-N-$\beta$-hydroxyethyl-m-acetoaminoaniline
12. N-(acetoacet-$\beta$-hydroxyethyl)-N-$\beta$-hydroxyethyl-3-chloroaniline
13. N-(acetoacet-$\beta$-hydroxyethyl)-N-$\beta$-hydroxyethyl-2,5-dimethoxyaniline
14. N-bis-(acetoacet-$\beta$-hydroxyethyl)-3-acetylaminoaniline Table

| Diazo component | CC | Shade on acetate rayon |
|---|---|---|
| 3-methylmercapto-5-aminothiadiazole-1,2,4 | (1) | red |
| | (2) | scarlet |
| | (4) | red |
| | (5) | red |
| | (6) | scarlet |
| | (7) | red |
| | (8) | red |
| | (9) | red |
| 3-carbomethoxyethylmercapto-5-aminothiadiazole-1,2,4 | (1) | red |
| | (3) | red |
| | (4) | red |
| | (5) | red |
| | (6) | red |
| | (7) | red |
| | (8) | red |

Table-Continued

| Diazo component | CC | Shade on acetate rayon |
|---|---|---|
| | (9) | ruby |
| 2-amino-5-phenylthiadiazole-1,3,4 | (2) | orange |
| | (3) | red |
| | (4) | red |
| | (5) | red |
| | (6) | orange |
| | (7) | red |
| | (8) | red |
| | (9) | red |
| 3-methylmercapto-5-aminothiadiazole-1,2,4 | (12) | rose |
| | (13) | ruby |
| | (14) | ruby |

I claim:
1. A dye having the formula

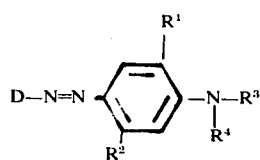

where
D is the radical of the formula

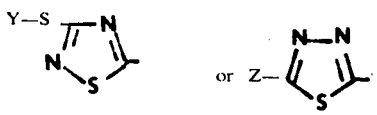

Y is methyl or carbomethoxyethyl,
Z is ethyl, phenyl or p-chlorophenyl,
$R^1$ is hydrogen, methyl, ethyl, methoxy or ethoxy;
$R^2$ is hydrogen, chlorine, methyl, ethyl, methoxy, ethoxy, acetylamino or propionylamino;
$R^3$ is the radical having the formula:

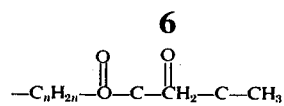

$R^4$ is the radical having the formula

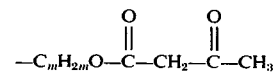

or the formula —$C_mH_{2m}$—X;
$n$ is one of the integers 2 and 3
$m$ is one of the integers 1, 2, 3 and 4; and
X is hydrogen, hydroxy, cyano, methoxy or ethoxy.

2. The dye of the formula

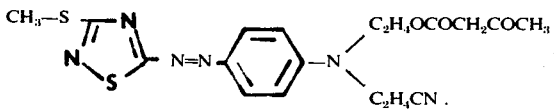

3. The dye of the formula

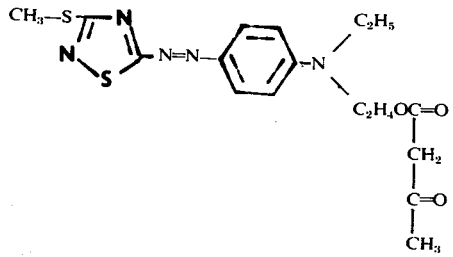

* * * * *

UNITED STATES PATENT OFFICE
CERTIFICATE OF CORRECTION

PATENT NO. : 3,910,874
DATED : October 7, 1975
INVENTOR(S) : Guenter Lange, deceased It is certified that error appears in the above-identified patent and that said Letters Patent are hereby corrected as shown below:

In Column 6, Claim 1, in the formula after "$R^3$ is the radical having the formula:" delete "$C_nH_{2n}-O-\overset{O}{\overset{\|}{C}}-CH_2-\overset{O}{\overset{\|}{C}}-CH_3$" and insert -- $C_nH_{2n}-O-\overset{O}{\overset{\|}{C}}-CH_2-\overset{O}{\overset{\|}{C}}-CH_3$ --

Signed and Sealed this

*twenty-second* Day of *June 1976*

[SEAL]

Attest:

RUTH C. MASON
*Attesting Officer*

C. MARSHALL DANN
*Commissioner of Patents and Trademarks*